United States Patent
Le Flem et al.

(10) Patent No.: US 7,186,156 B2
(45) Date of Patent: Mar. 6, 2007

(54) ELECTRIC PROPULSION UNITS

(75) Inventors: Graham Derek Le Flem, Rugby (GB); Jacques Enon, Nancy (FR)

(73) Assignee: Converteam Ltd, Warwickshire (GB)

( * ) Notice: Subject to any disclaimer, the term of this patent is extended or adjusted under 35 U.S.C. 154(b) by 0 days.

(21) Appl. No.: 10/381,064

(22) PCT Filed: Jul. 29, 2002

(86) PCT No.: PCT/GB02/03479

§ 371 (c)(1),
(2), (4) Date: Sep. 22, 2003

(87) PCT Pub. No.: WO03/015241

PCT Pub. Date: Feb. 20, 2003

(65) Prior Publication Data
US 2004/0053545 A1 Mar. 18, 2004

(30) Foreign Application Priority Data
Aug. 6, 2001 (GB) ................................. 0119041.2

(51) Int. Cl.
*B63H 21/17* (2006.01)
(52) U.S. Cl. ....................................................... 440/6
(58) Field of Classification Search .................... 440/6; 310/52, 58, 59
See application file for complete search history.

(56) References Cited

U.S. PATENT DOCUMENTS

| 2,382,218 | A | * | 8/1945 | Fernstrum | 440/88 R |
| 2,914,012 | A | * | 11/1959 | Hayden et al. | 440/88 R |
| 4,547,688 | A | * | 10/1985 | Hammer et al. | 310/59 |
| 4,845,394 | A | * | 7/1989 | Kleinhans | 310/64 |
| 5,101,128 | A | | 3/1992 | Veronesi et al. | |
| 5,403,216 | A | * | 4/1995 | Salmi et al. | 440/6 |
| 5,757,094 | A | * | 5/1998 | van Duyn | 310/58 |
| 5,789,833 | A | | 8/1998 | Kinoshita et al. | |
| 6,231,407 | B1 | * | 5/2001 | Hein et al. | 440/6 |
| 2003/0236036 | A1 | * | 12/2003 | Varis | 440/6 |

FOREIGN PATENT DOCUMENTS

| EP | 0 590 867 A1 | 4/1994 |
| EP | 1 010 614 A1 | 6/2000 |
| JP | 08149756 | 6/1996 |
| JP | 11278379 | 10/1999 |
| WO | WO 97/49605 | 12/1997 |

* cited by examiner

*Primary Examiner*—Ed Swinehart
(74) *Attorney, Agent, or Firm*—Kirschstein, et al.

(57) ABSTRACT

A propulsion unit for propelling a waterborne vessel includes an electric motor arranged to provide propulsion, and a housing arranged to contain the motor. The interior of the housing is maintained at an increased pressure of above roughly 2 bar to increase the cooling effect of a cooling gas maintained therein. An end region of the housing is provided with a heat exchange mechanism arranged to cool a cooling gas passing thereover. The heat exchange mechanism is associated with the housing such that, in use, water surrounding the housing absorbs heat therefrom.

24 Claims, 4 Drawing Sheets

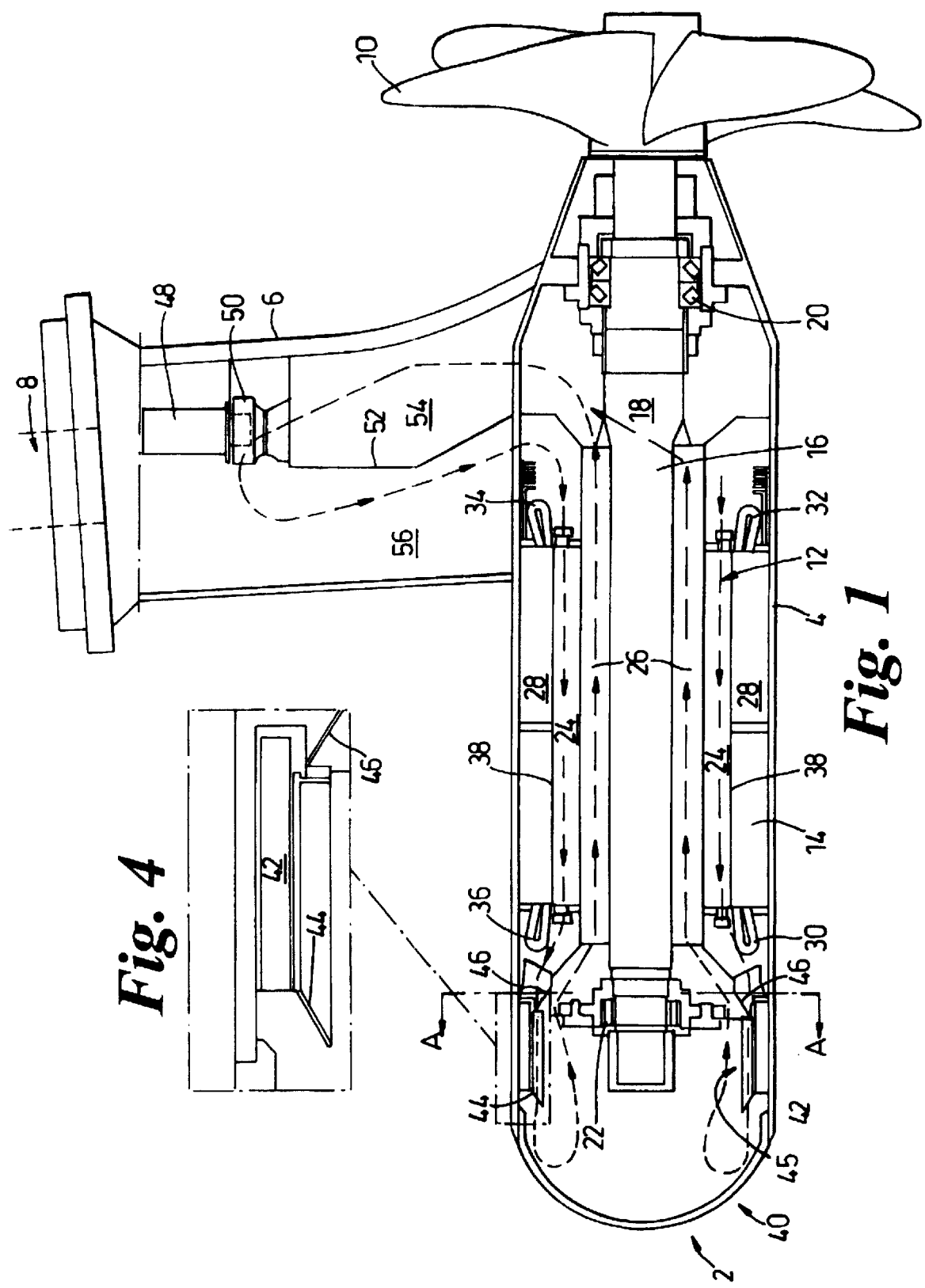

ELECTRIC PROPULSION UNITS

FIELD OF THE INVENTION

This invention relates to an improved propulsion unit, and an improved method of cooling such a propulsion unit.

BACKGROUND OF THE INVENTION

It is well known to provide propulsion units that are suspended below the hull of a ship in order to provide the ship with propulsion. Examples of such propulsion units are shown in U.S. Pat. Nos. 6,231,407 and 5,101,128.

The unit shown in U.S. Pat. No. 6,231,407 contains an electric motor having a permanent magnet rotor. Such motors are attractive because they suffer from low losses in the rotor and therefore do not generate excessive heat. Such heat generated by the rotor can relatively easily be dissipated by conduction/convection to the remainder of the unit. However, such motors are disadvantageous because the permanent magnets used to generate the rotor magnetic field are expensive, it is hard to assemble the rotor, and a suitable power converter system must be employed. The power converter system must be able to cope with large changes in power factor with load, which such a motor produces because there is no control of the rotor excitation.

U.S. Pat. No. 5,101,128 shows a further example of a propulsion unit using water cooling, which incorporates a bellows and filter to equalise water pressure, from outside of the unit. The arrangement provided is complex, which leads to increased manufacturing and maintenance costs. Increased maintenance is a particular disadvantage due to the poor access to the units, and therefore, it is generally desired to make the units as simple as possible.

It is an aim of the present invention to overcome, or at least reduce, the problems of the prior art.

SUMMARY OF THE INVENTION

According to a first aspect of the invention there is provided a propulsion unit arranged to propel a water borne vessel comprising an electric motor, arranged to provide propulsion, and a housing, arranged to contain the motor, the interior of the housing being maintained at an increased pressure of above roughly 2 bar to increase the cooling effect of a cooling gas maintained therein.

An advantage of such an arrangement is that it provides a simple structure that is thus easier to maintain than some prior art propulsion units.

Preferably, the motor is an induction motor. An advantage of such a propulsion unit is that it provides a mechanically simple and robust motor.

An agitator may be provided to circulate cooling gas within the housing. Such an agitator is advantageous because it forces circulation of the cooling gas, which can lead to increased cooling.

In the preferred embodiment the agitator comprises at least one fan, but other mechanical equivalents may also be possible. Such a fan may be driven by a motor, or may be driven by a mechanical link to the motor of the unit. The mechanical link may be by any suitable means: drive belt, gears, chain drive, shaft drive, or the like.

The cooling gas may be driven longitudinally along a rotor of the motor. Driving gas along the rotor in this manner may lead to efficient cooling of the rotor.

In one embodiment the rotor comprises a cylindrical body mounted upon a shaft having an axis of rotation, the arrangement being such that a first cooling passage is provided between the cylindrical body and the shaft. An advantage of such cooling passages is that they provide a convenient way of conducting cooling gas along the rotor.

The cylindrical body mounted upon the shaft may comprise the rotor windings, which preferably has a second cooling passage therethrough. Again an advantage of such cooling passages is that they provide a convenient way of conducting cooling gas along the rotor.

In one, perhaps the preferred, embodiment the unit is arranged such that cooling gas passes along the first cooling passage in a first direction, and along the second cooling passage in a second direction, different from the first. Preferably, the first direction is roughly in an opposite direction to the second. Such an arrangement is advantageous because it provides a clear circulation of gas around the unit, which may increase the cooling efficiency.

Preferably, the unit is arranged such that a heat exchange region is provided between the first cooling passage and the second cooling passage. Such an arrangement is advantageous because is allows heat to be removed from the gas passing along either of the cooling passages.

The heat exchange region preferably comprises fins, or the like, provided on an internal surface of a housing of the unit. This provides a simple structure that provides heat exchange; it will be appreciated that, in use, the unit will be submersed in water and that therefore, the housing of the unit will be in contact with the water providing a good heat exchange medium. The advantage of the fins is that the efficiency of the heat exchange with the housing is increased.

The fins may be fabricated from a material having a high thermal conductivity, such as aluminium, or copper. Alternatively, or additionally the fins may be fabricated integrally with the housing. Fabricating the fins integrally is advantageous due to the ease of manufacture that such an arrangement would bring.

The fins may be provided in an end region of the housing. Such an arrangement is advantageous because the end region provides a convenient area having a relatively large contact with water outside the unit, and therefore, provides a good capacity for removing heat from the fins.

Conveniently, the unit is arranged such that gas flowing in the second direction, exits the second cooling passage into the heat exchange region. An advantage of this flow direction is that gas exiting the second passage is likely to be hotter than that exiting the first cooling passage, and it is therefore advantageous to provide heat exchange for this gas.

The stator may include end turns, which protrude from the stator, and conveniently the unit is arranged such that air exiting/entering either of the cooling passages passes over the end turns. This is advantageous because it provides extra cooling for the end turns.

The pressure may be in the range of roughly 2 bar to roughly 7 bar. This range is believed suitable because, pressures below 2 bar are believed to provide negligible increased benefit, whilst pressures above 7 bar disproportionately increase the cost of the propulsion unit and require excess power to circulate the gas therein.

Such an arrangement is advantageous because the increased pressure helps to remove the pressure gradient across seals between the outside and the inside of the unit (for example around the shaft on which the propeller is mounted). Reduction of the pressure gradient helps to make the seal and prevent water from entering the unit. Further, the increased pressure can be used to help drain water that has entered the unit by driving the water back up a stay connecting the unit to the vessel to which it is attached. The skilled person will appreciate that the increased pressure improves the heat transfer, since the heat transfer coefficient (h) increases significantly with air density (typically $h \propto \rho^{0.64}$).

Conveniently, the stator is mounted such that it is in good thermal contact with the inside surface of a housing for the unit. Such an arrangement provides efficient cooling of the stator. Good thermal contact would generally mean in contact, but is intended to cover situations in which a high thermal conductivity member is placed between the stator and the housing.

Preferably, the cooling gas is air, but any suitable cooling gas may be used. For example $CO_2$, nitrogen, refrigerant gases, noble gases, etc. may be used. Air is advantageous because it is cheap, readily available, and non-toxic.

According to a second aspect of the invention there is provided a propulsion unit arranged to propel a water borne vessel comprising an electric motor, arranged to provide propulsion, said unit further comprising a housing that contains the motor, wherein an end region of the housing is provided with a heat exchange mechanism arranged to cool cooling gas passing thereover, the heat exchange mechanism being associated with the housing such that, in use, water surrounding the housing absorbs heat therefrom.

Such a unit is advantageous because it is mechanically simple and yet can provide effective cooling for the motor. It will be appreciated that, in use, the housing is surrounded by water and is therefore, itself, readily cooled, and can absorb heat from the heat exchange mechanism.

The heat exchange mechanism may comprise one or more fins provided on an interior surface of the housing, and therefore provides a large surface area over which heat exchange can occur.

The fins may be fabricated from a material having a high thermal conductivity such as aluminium or copper, thereby increasing the rate of heat exchange between the cooling gas and the housing.

The fins may be fabricated integrally with the housing, and as such provide a structure that is simple to fabricate.

In some embodiments the motor comprises a stator that includes end turns that protrude from the stator. In such cases the unit may be arranged such that the cooling gas passes over the end turns before passing the heat exchange mechanism. Such an arrangement can provide efficient cooling of stator end windings, which is advantageous, because these end windings will not be in closely associated with the housing and will not be as well cooled as the remainder of the stator.

The motor comprises a rotor, which may comprise a cylindrical body mounted upon a shaft having an axis of rotation, the arrangement being such that a first cooling passage is provided between the cylindrical body and the shaft.

The cylindrical body mounted upon the shaft may comprise the rotor windings. The rotor windings may have a second cooling passage therethrough.

Preferably the unit is arranged such that cooling gas passes along the first cooling passage in a first direction, and along the second cooling passage in a second direction, different from the first.

It is convenient if the first direction is roughly in an opposite direction to the second. Such an arrangement provides a convenient circuit for circulating air within the housing, which provides efficient cooling of the rotor.

Preferably, the pressurised gas is at any pressure between roughly 2 bar and roughly 7 bar i.e. it may be roughly any of the following pressures: 2, 3, 4, 5, 6, 7 bar.

The motor may be an induction motor, or may be a synchronous motor.

Conveniently, the pressurised gas is air, but any suitable gas may be used. For example $CO_2$, nitrogen, refrigerant gases, noble gases, etc. may be used. Air is advantageous because it is cheap, readily available, and non-toxic.

The pressurised gas may be circulated by at least one agitator, which conveniently comprises a fan. An advantage of such an agitator is that it forces movement of the gas, which in turn moves heat past heat exchange surfaces, increasing the cooling effect.

According to a third aspect of the invention there is provided a propulsion unit arranged to propel a water borne vessel comprising an electric motor arranged to provide propulsion, said unit further comprising a housing that contains the motor, wherein an end region of the housing is provided with a heat exchange mechanism arranged to cool cooling gas passing thereover and wherein the interior of the housing is maintained at an increased pressure of about roughly 2 bar to increase the cooling effect of a cooling gas maintained therein.

According to a fourth aspect of the invention there is provided a method of cooling a propulsion unit comprising a motor provided in a housing and arranged to drive a propeller for propulsion, comprising pressurising a gas within the housing in order to increase the cooling provided by the gas.

According to further aspects of the invention there are provided a method of cooling a propulsion unit according to any of the earlier aspects of the invention.

BRIEF DESCRIPTION OF THE DRAWINGS

There now follows by way of example only a detailed description of the invention with reference to the accompanying drawings of which:

FIG. 1 is a side elevation of one embodiment of a propulsion unit according to the present invention;

FIG. 4 is an enlargement of a portion of FIG. 1 showing a baffle arrangement;

DESCRIPTION OF PREFERRED
EMBODIMENTS OF THE INVENTION

Figures 2, 3:
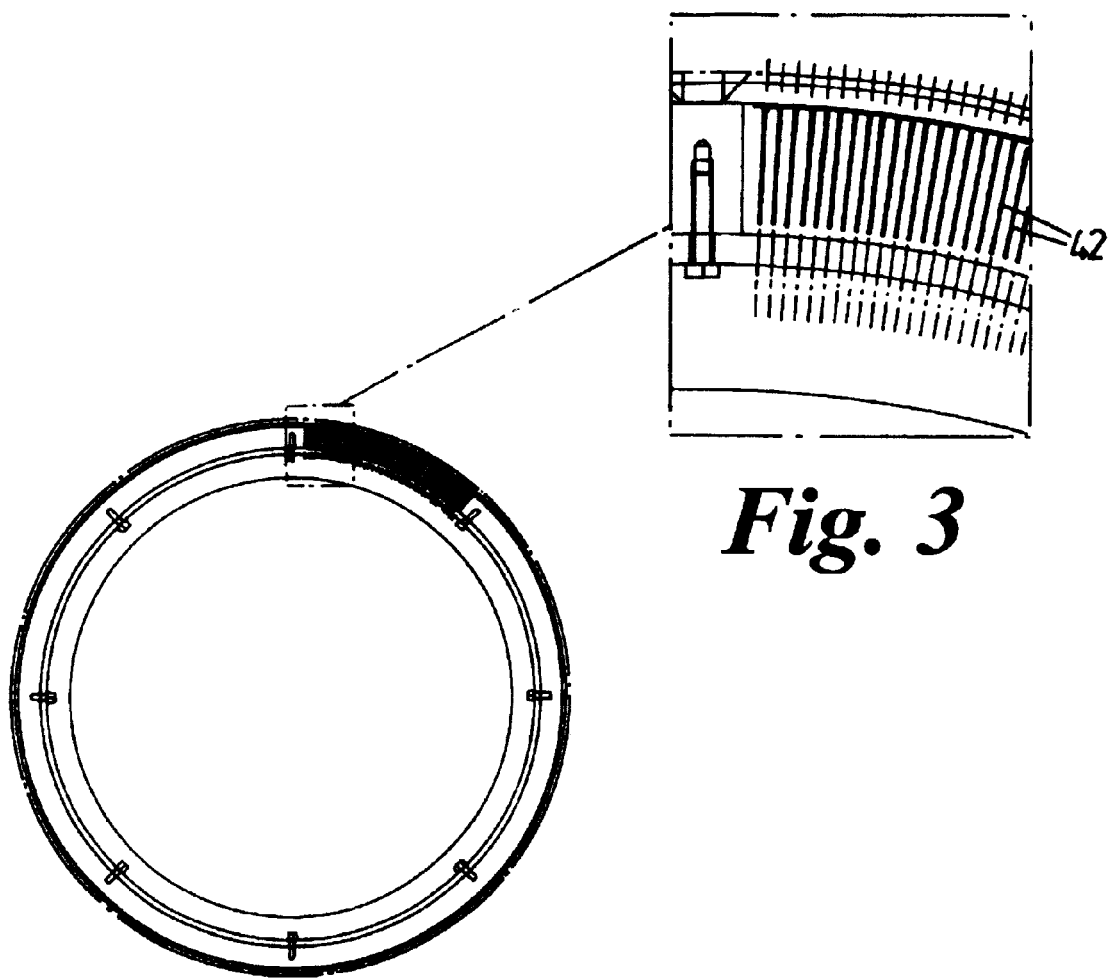
FIG. 2 is a cross section along line AA of FIG. 1.
FIG. 3 is an enlargement of a portion of FIG. 2.

The propulsion units 2 shown in FIGS. 1 and 2 have a housing 4 arranged to be suspended from beneath a hull of a ship (not shown) by a stay 6. The stay 6 includes at a top region thereof slip rings 8, which allow the housing 4 and stay 6 to be rotated through 360° to provide directional thrust for the ship to which the arrangement is attached. A propeller 10 is driven by a motor 12 contained within the housing 4.

Figure 8:
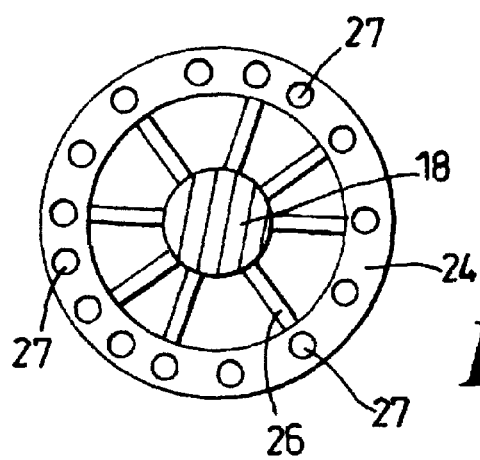
FIG. 8 shows a cross section through the rotor of a motor of FIG. 1.

The motor 12 comprises an electrical induction motor having a stator 14, and a rotor 16. The rotor 16 comprises a central shaft 18 supported by bearings 20,22. The central shaft 18 supports, using supporting arms 26, a cylindrical body comprising rotor windings 24, and a cross section of a rotor is shown in FIG. 8. The spaces between the arms 26 provide a first cooling passage, which will be described hereinafter. A second cooling passage is provided by ducts 27 within the rotor windings 24 and provides a cooling path longitudinally along the rotor. The stator 14 comprises a winding 28, the stator being a shrink or press fit into the housing 4. Alternatively, a clearance fit may be used in conjunction with a high thermal conductivity adhesive to fix the stator within the housing. End turns 30,32,34,36 of the field winding 28 are shown at end regions thereof. Power to the winding 28 is supplied via cables (not shown) which pass along the stay 6 from the ship. An air gap 38 (of roughly 4 mm in this embodiment) exists between the stator 14 and the rotor 16. It will be appreciated that such an air gap is not large enough to allow convection.

The winding 28 is of conventional design. However, the winding 28 is mounted in close proximity to the housing 4, and thus water surrounding the housing provides sufficient cooling for the winding 28.

Turning specifically to the propulsion unit shown in FIG. 1, an end region 40 of the propulsion unit 4 comprises roughly hemi-spherical end cap that is mounted upon a cylindrical wall. A plurality of heat exchange fins 42 are arranged in a roughly equispaced manner around the inside wall of an end region of the cylindrical wall, adjacent the hemi-spherical shell, and the arrangement of these fins 42 is more clearly shown in FIG. 3. A baffle 44 comprising a band, a first edge of which runs around a first radius from the rotor, and a second edge of which runs around a second radius from the rotor, is positioned such that its edge having the greater radius is positioned adjacent the heat exchange fins 42. The baffle 44 is provided in a heat exchange region 45, helps to lengthen the path of cooling air, as will be explained hereinafter, and directs air through the heat exchange fins 42. A baffle 46 of a similar shape to the previously described baffle 44 is provided on an exit of the heat exchange fins 42, again to direct the flow of cooling air.

Figure 9:
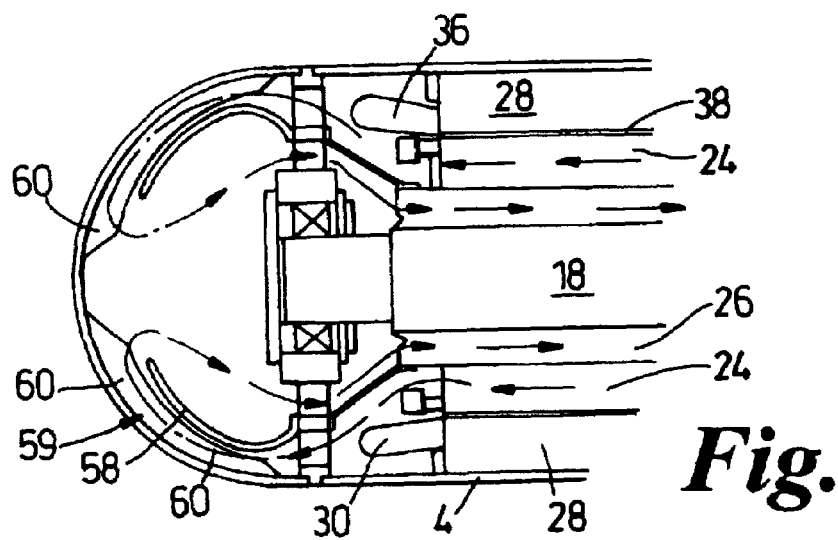
FIG. 9 shows an alternative arrangement for the embodiment of the propulsion unit shown in FIG. 1.

FIG. 9 shows an alternative arrangement for the propulsion unit shown in FIG. 1, in which the baffle 44 of FIG. 1 has been extended in length and curved to form the baffle 58, in the heat exchange region 59 shown in FIG. 9. This extension of the baffle 58 lengthens the air path and keeps the cooling air in contact with the hemispherical portion 40 of the housing 4 for longer. Further, the heat exchange fins 42 of FIG. 1 have lengthened to form fins 60 of FIG. 9. This lengthening provides an increased heat exchange area for the length of the path defined by the baffle 58.

A fan motor 48 provided in the stay 6 is arranged to drive a centrifugal fan 50 to provide an agitator to circulate air through the motor 12. A further partition 52 runs along a central region of the stay 6 in order to divide the stay 6 into an inlet portion 54 for cooling air, and an outlet portion 56 for cooling air. (It will be appreciated that this refers to inlet and outlet of the stay 6 since the propulsion unit 2 is submerged underneath a ship, and that air is circulated around the inside of the housing 4 and stay 6).

In use, the fan motor 48 drives a centrifugal fan 50 to draw air into the air inlet portion 54, through the fan 50 and out of the stay 6 through the outlet portion 56. Once the air has passed from the outlet portion 56 into the housing 4 it passes along the ducts 27 within the rotor windings 24. The partition 52 extends into the housing 4 and is brought into close proximity with the rotor 16 to ensure that air passing from the outlet portion 56 is so directed. As air passes into the rotor windings 24 it passes the end turns 32,34 of the winding 28 and thus provides a cooling action thereto. Further, as air exits the rotor windings 24 is passes the end turns 30,36 of the stator winding. Further, air exiting the rotor winding 24 is directed by the baffle 46 through the heat exchange fins 42 (60 in FIG. 9), where the air is cooled via heat exchange with these fins 42,60, which are in good thermal contact with the housing 4. The baffle 44 (58 in FIG. 9) ensures that air flow is maintained in contact with the heat exchange fins 42,60 for a predetermined period, before passing back along the rotor 16 through the spaces between the supporting arms 26. After exiting the rotor 16 the air is drawn up in to the inlet portion 54 of the stay 6.

Figure 5:
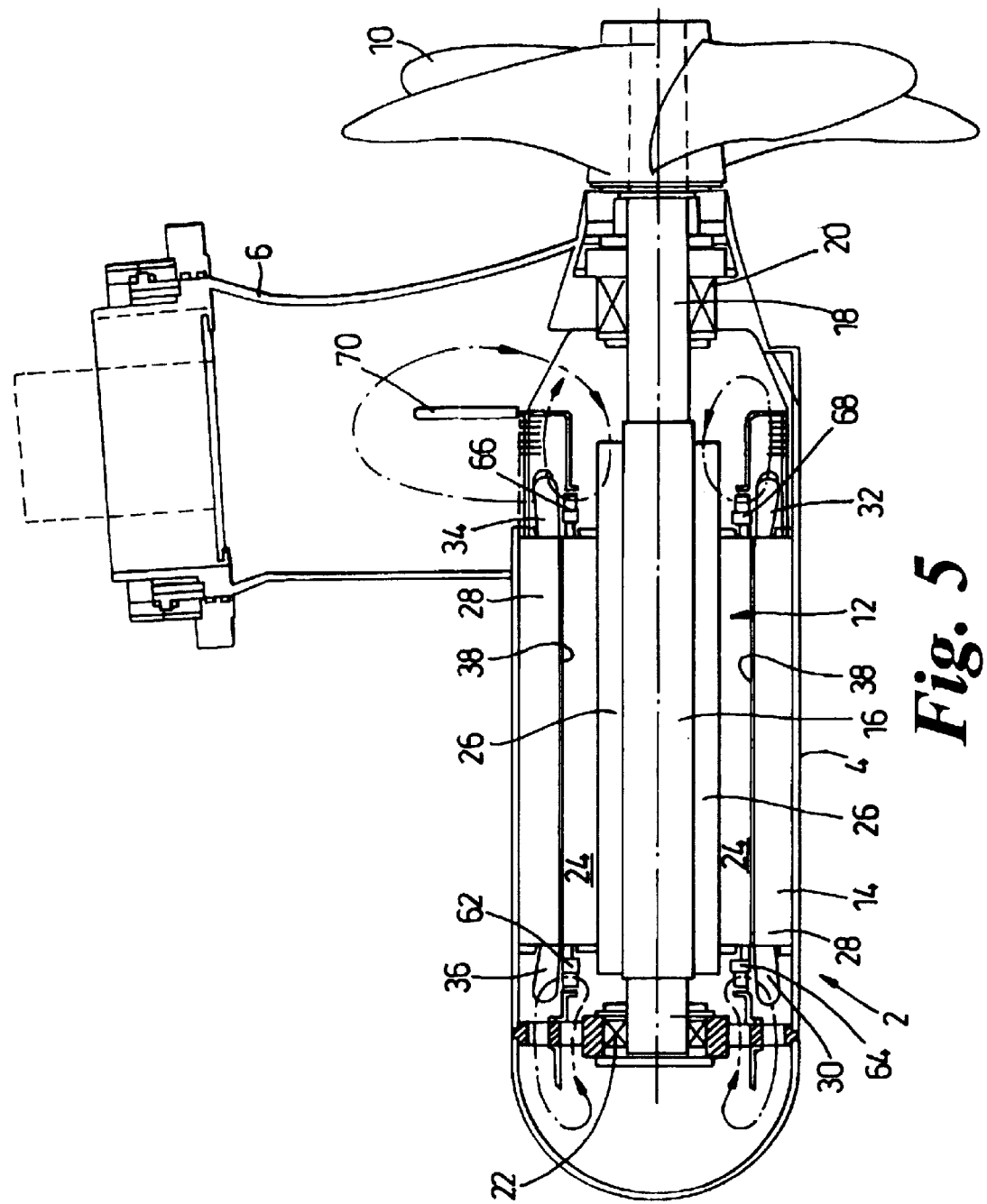
FIG. 5 shows a side elevation of a second embodiment of a propulsion unit according to the present invention.
Figure 6:
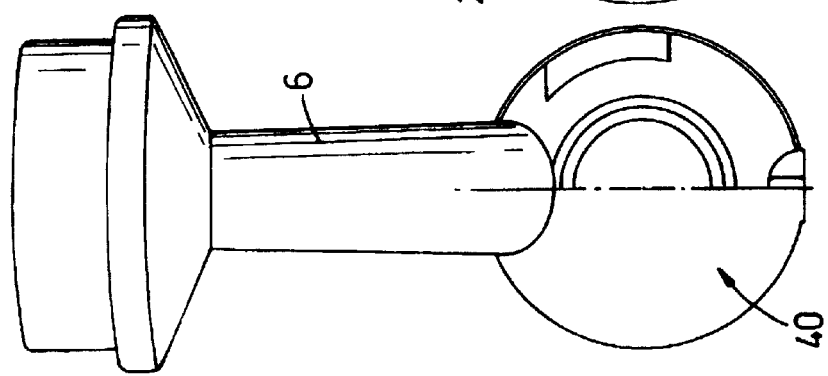
FIG. 6 is an end elevation of the housing for the embodiments shown in FIGS. 1 and 5.
Figure 7:
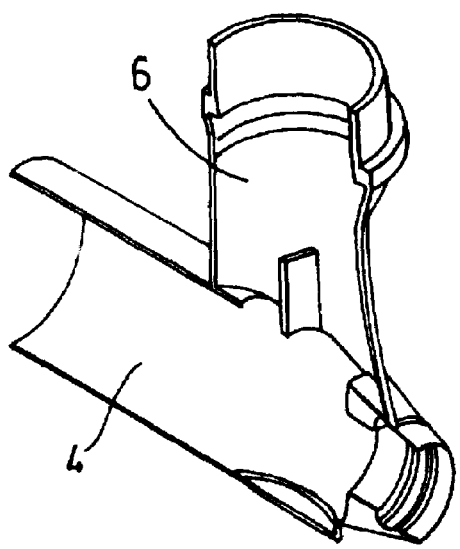
FIG. 7 is a perspective view of a portion of the housing shown in FIG. 6.

Turning to the embodiment shown in FIG. 5, it will be noted that the main difference is that air is forced to circulate longitudinally of the rotor 16. Instead a plurality of fans, or agitators, are used to locally force convection as will now be described.

A fan 62,64,66,68 is positioned adjacent each of the end turns 30,32,34,36 of the stator winding 28 and forces local circulation of the air therethrough. A partition 70 extends up into the stay 6 such that air is forced to circulate by the fan 66 in proximity to the wall of the stay 6, which improves the cooling provided by the fan 66.

Air within the housing 4 and stay 6 is maintained at a pressure above atmospheric. Pressures in the range of 2 bar to 7 bar are believed to be advantageous. This increased pressure can also usefully be used to help remove seawater from a bottom region (generally referred to as a sump) of the housing, and also helps to maintain a seal around the portion of the rotor 16 passing through the housing 4 to the propeller 10.

The invention claimed is:

1. A propulsion unit for propelling a waterborne vessel, comprising:
    a) an electric motor for providing propulsion, the motor including a rotor having a cylindrical body mounted upon a shaft having an axis of rotation, the cylindrical body including rotor windings, a first cooling passage being provided between the cylindrical body and the shaft, and a second cooling passage being provided through the rotor windings;
    b) a housing for containing the motor and bounding an interior through which a cooling gas is passed longitudinally of the rotor along the first cooling passage in a first direction and along the second cooling passage in a second direction different from, and opposite to, the first direction, the interior being maintained at an increased pressure of above roughly 2 bar to increase a cooling effect of the cooling gas; and
    c) a heat exchange region including fins provided on an internal surface of the housing between the first cooling passage and the second cooling passage.

2. The unit according to claim 1, wherein the fins are constituted of a material having a high thermal conductivity.

3. The unit according to claim 1, wherein the fins are associated with the housing such that, in use, water surrounding the housing absorbs heat from the fins.

4. The unit according to claim 1, wherein the fins are integral with the housing.

5. The unit according to claim 1, wherein the fins are provided in an end region of the housing.

6. The unit according to claim 1, wherein the cooling gas flowing in the second direction exits the second cooling passage into the heat exchange region.

7. The unit according to claim 1, wherein the motor also comprises a stator that includes end turns that protrude from the stator, and wherein the unit is arranged such that the cooling gas passing along the cooling passages passes over the end turns.

8. The unit according to claim 7, wherein the stator is mounted in good thermal contact with an inside surface of the housing.

9. The unit according to claim 1, wherein the cooling gas is air.

10. The unit according to claim 1, wherein the pressure within the housing is between roughly 2 bar and roughly 7 bar.

11. The unit according to claim 1, wherein the motor is one of an induction motor and a synchronous motor.

12. The unit according to claim 1, and an agitator for circulating the cooling gas within the housing.

13. The unit according to claim 12, wherein the agitator comprises at least one fan.

14. A propulsion unit for propelling a waterborne vessel, comprising:
   a) an electric motor for providing propulsion, the motor including a stator that includes end turns that protrude from the stator, and a rotor having a shaft that has an axis of rotation; and
   b) a housing for containing the motor, the housing having an axial end region provided with a heat exchange mechanism arranged to cool a cooling gas passing thereover, the heat exchange mechanism comprising at least one fin provided on an interior surface of the housing such that, in use, water surrounding the housing absorbs heat therefrom, the cooling gas passing over the end turns before passing the heat exchange mechanism.

15. The unit according to claim 14, wherein said at least one fin is constituted of a material having a high thermal conductivity.

16. The unit according to claim 14, wherein said at least one fin is integral with the housing.

17. The unit according to claim 14, wherein the rotor comprises a cylindrical body mounted upon the shaft, and wherein a first cooling passage is provided between the cylindrical body and the shaft.

18. The unit according to claim 17, wherein the cylindrical body mounted upon the shaft comprises rotor windings for the rotor.

19. The unit according to claim 18, wherein the rotor windings have a second cooling passage therethrough.

20. The unit according to claim 19, wherein the cooling gas passes along the first cooling passage in a first direction, and along the second cooling passage in a second direction, different from the first direction.

21. The unit according to claim 20, wherein the first direction is roughly in an opposite direction to the second direction.

22. The unit according to claim 14, wherein the housing has an interior maintained above a pressure of roughly 2 bar.

23. A propulsion unit for propelling a waterborne vessel, comprising:
   a) an electric motor for providing propulsion with concomitant generation of heat, the motor including a stator and a rotor rotatable about an axis;
   b) a housing for containing the motor, the housing having a front end region which, in use, is submerged in ambient water and is in a heat exchange relationship with the ambient water; and
   c) means for circulating a cooling gas within the housing, including means for directing the cooling gas past the motor to absorb the heat generated therefrom, and for directing the cooling gas after heat absorption into the front end region for transferring the heat to the ambient water, the circulating means including fins for directing the cooling gas along the axis, and baffles for deflecting the cooling gas transversely of the axis and into the front end region.

24. The unit according to claim 23, and a plurality of cooling passages extending through the motor along the axis, and wherein the fins and the baffles are located at at least one end of the cooling passages.

* * * * *